(No Model.)
D. B. COOLEY.
TRACE CARRIER.
No. 266,432. Patented Oct. 24, 1882.
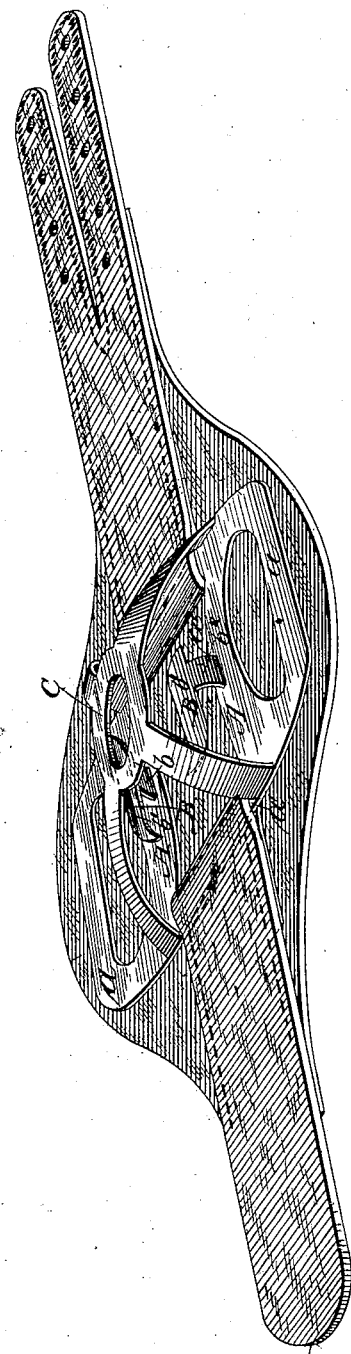
Witnesses.
Chas. Edmonston
Jas. H. Baxter
Inventor.
Duane B. Cooley
By Myers &c.
Attorneys.

United States Patent Office.

DUANE B. COOLEY, OF YANKTON, DAKOTA TERRITORY, ASSIGNOR OF ONE-HALF TO JOHN O. BATES, OF SAME PLACE.

TRACE-CARRIER.

SPECIFICATION forming part of Letters Patent No. 266,432, dated October 24, 1882.

Application filed June 15, 1882. (No model.)

*To all whom it may concern:*

Be it known that I, D. B. COOLEY, a citizen of the United States, residing at Yankton, in the county of Yankton, Territory of Dakota, have invented certain new and useful Improvements in Trace-Carriers, of which the following is a specification, reference being had therein to the accompanying drawing.

My invention relates to certain improvements in trace-carriers, and has for its object the prevention of the horse's tail or reins from catching on the hooks thereof, and securely holding the cockeyes in place against any possibility of their falling off while handling the harness or while the harness is on the horse.

To these ends my invention consists of caged approximately parallel carrier-hooks, constructed substantially as hereinafter more fully set forth.

In the accompanying drawing the figure is a plan view of my improved trace-carrier.

In carrying out my invention I employ two base-pieces or wings, $a$ $a$, which are connected together by bars $a'$ $a'$, forming collectively a frame, A, which is connected to the back-strap, as shown, or otherwise. Upon the wings are secured hooks or the carriers proper, B, which are arranged approximately parallel to each other. They consist individually of a short shank, $b$, projecting in a curved form from the wing or base, and of a narrow plate or arm, $b'$, arranged at right angles to the upright and curved slightly inward at the end that is farther from the upright and slightly outward at its opposite end. These hooks, between which the cockeye is passed, enable the carrying of the same. The arms $b'$ are formed S-shaped on their inner edges and longer from the center of the curved stud toward the head or front of the harness than toward the rear of the same. The cockeyes are put on the curved stud $b$ over said long arms first, then, passing over the receding heel or part, fall in place on the curved stud $b$. The trace, with cockeye can only be removed from said stud by passing the eye of the same first over the receding heel or part, then over the long arm $b'$, thus preventing displacement while handling the harness or putting it on or off the animal.

When the harness, with my improvement attached, is handled or hung up by the hames, the cockeyes pull against the curved studs underneath the long arms $b'$, effectually preventing accidental detachment.

By reason of their construction, the cockeyes can be readily and easily slipped on and off the said arms $b'$; but when once placed in position on the curved stud they are secure against accidental detachment therefrom.

Over the frame A is formed a dome-shaped cage or shield, C, constructed as shown. The object of this cage is to prevent the trace from being removed only as the cockeye is passed over the short end of the arm $b'$ first, then over the long arm, when it will be released and prevent the reins or the tail from catching into the arms or hooks of the carrier.

I am aware that trace-carriers have been constructed and patented with dome-shaped cages or frames having upwardly-curved tongues hinged to the base-plate, and with upright posts and cross-heads of equal length for the purpose of holding the cockeyes and suspending the traces, as shown by the patents to Sholl and Hayden. Therefore these I do not broadly claim; but what I desire to secure by Letters Patent is embodied in the following claim:

A trace-carrier comprising the base-plate A, slotted as described, to form the end loops, the dome-shaped cage or shield $b$, hooks or carriers B, S-shaped on their inner edges, each having an inwardly-curved projecting point and rounded receding heel, and each secured to the base-plate $a$ by the short curved stud $b^2$, attached to the hooks at one side of the center thereof, as and for the purpose set forth.

In testimony whereof I affix my signature in presence of two witnesses.

DUANE B. COOLEY.

Witnesses:
WILLIAM F. ELDRIDGE,
JOHN O. BATES.